(12) United States Patent
Takada et al.

(10) Patent No.: US 10,583,743 B2
(45) Date of Patent: Mar. 10, 2020

(54) REGENERATIVE BRAKING DEVICE AND DUMP TRUCK

(71) Applicant: HITACHI CONSTRUCTION MACHINERY CO., LTD., Tokyo (JP)

(72) Inventors: Tomonori Takada, Tsuchiura (JP); Takanobu Ikari, Tsuchiura (JP); Takashi Ikimi, Tsuchiura (JP); Akihiro Nakamura, Tokyo (JP); Masatsugu Arai, Tsuchiura (JP); Naoki Fukuda, Tsuchiura (JP); Takaaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/764,556

(22) PCT Filed: Sep. 8, 2016

(86) PCT No.: PCT/JP2016/076427
§ 371 (c)(1),
(2) Date: Mar. 29, 2018

(87) PCT Pub. No.: WO2018/047270
PCT Pub. Date: Mar. 15, 2018

(65) Prior Publication Data
US 2018/0272871 A1    Sep. 27, 2018

(51) Int. Cl.
*B60L 7/06* (2006.01)
*B60K 11/06* (2006.01)
(Continued)

(52) U.S. Cl.
CPC .................. *B60L 7/06* (2013.01);
*B60K 6/46* (2013.01); *B60K 7/0007* (2013.01);
*B60K 11/06* (2013.01);
(Continued)

(58) Field of Classification Search
CPC ...... B60L 7/06; B60L 7/14; B60L 7/22; B60L 2210/10; B60L 2200/36; H02P 3/18; H02P 3/22; H02P 2201/07
See application file for complete search history.

(56) References Cited

U.S. PATENT DOCUMENTS 7,996,163 B2 *  8/2011  Bailey .................... B60L 50/61
                                                702/58
9,014,898 B2 *  4/2015  Saito ...................... B60L 5/045
                                                701/22

(Continued)

FOREIGN PATENT DOCUMENTS

JP       08-289406 A     11/1996
JP      2012-184687 A     9/2012

(Continued)

OTHER PUBLICATIONS

Mi et al., Operation, design and control of dual H-bridge isolated bidirectional DC-DC converter, Jan. 5, 2008, Institute of Engineering and Technology, IET Power Electron., vol. 1, No. 4, pp. 507-517 (Year: 2008).*

(Continued)

*Primary Examiner* — James A Shriver, II
*Assistant Examiner* — Steve Clemmons
(74) *Attorney, Agent, or Firm* — Mattingly & Malur, PC

(57) ABSTRACT

In a regenerative braking device of a dump truck comprising an engine, a first generator and a second generator driven by the engine, at least one travel motor driven by generated electric power of the first generator and at least one fan motor to which generated electric power of the second generator is inputted via a first rectifier circuit, the regenerative braking device comprises: a resistive element to which regenerating electric power from the at least one travel motor in regenerative braking is supplied and which is cooled by at least one fan driven by the at least one fan (Continued)

motor and converts electric energy into heat energy and dissipates heat; and a DC/DC converter that inputs a part of the regenerating electric power which is supplied to the resistive element to an output line of the first rectifier circuit via a second rectifier circuit.

4 Claims, 7 Drawing Sheets

(51) Int. Cl.

| | | |
|---|---|---|
| *H02P 3/22* | (2006.01) | |
| *B60L 1/02* | (2006.01) | |
| *B60L 1/00* | (2006.01) | |
| *B60W 30/18* | (2012.01) | |
| *B60K 6/46* | (2007.10) | |
| *B60K 7/00* | (2006.01) | |
| *H02M 3/335* | (2006.01) | |
| *H02P 3/18* | (2006.01) | |
| *H02P 5/74* | (2006.01) | |
| *B60K 1/00* | (2006.01) | |
| *B60P 1/04* | (2006.01) | |

(52) U.S. Cl.
CPC ............... *B60L 1/003* (2013.01); *B60L 1/02* (2013.01); *B60W 30/18127* (2013.01); *H02M 3/33569* (2013.01); *H02P 3/18* (2013.01); *H02P 3/22* (2013.01); *H02P 5/74* (2013.01); *B60K 2001/003* (2013.01); *B60L 2200/36* (2013.01); *B60L 2210/10* (2013.01); *B60P 1/04* (2013.01); *B60W 2300/125* (2013.01); *B60Y 2200/142* (2013.01); *H02P 2201/07* (2013.01); *Y10S 903/902* (2013.01)

(56) References Cited

U.S. PATENT DOCUMENTS

| | | | |
|---|---|---|---|
| 9,018,878 B2* | 4/2015 | Hendrickson | H02P 29/028 318/461 |
| 9,889,746 B2* | 2/2018 | Wolff | B60L 7/20 |
| 2010/0039054 A1 | 2/2010 | Young et al. | |
| 2012/0062155 A1* | 3/2012 | Wang | H02P 3/22 318/380 |

FOREIGN PATENT DOCUMENTS

| | | | |
|---|---|---|---|
| JP | 2014-018063 A | | 1/2014 |
| JP | 2014-054117 A | | 3/2014 |
| JP | 2014054117 A | * | 3/2014 |
| WO | 2012/164798 A1 | | 12/2012 |

OTHER PUBLICATIONS

Schmidt-Wlater, Heinz, and Ralf Kories, Electrical Engineering: A Pocket Reference, Artech House, 2007, pp. 489-491 (Year: 2007).*
International Search Report of PCT/JP2016/076427 dated Nov. 15, 2016.

* cited by examiner

REGENERATIVE BRAKING DEVICE AND DUMP TRUCK

TECHNICAL FIELD

The present invention relates to a regenerative braking device and a dump truck comprising the regenerative braking device.

BACKGROUND ART

In recent years, on a mine site, various types of construction machines have been used; for example, dump trucks are used for haulage. The haulage costs of ores in mines comprise labor costs, fuel costs, maintenance costs, initial investments, or the like, and it is said that the fuel costs take a second largest part after the labor costs. Therefore, it is required to save energy of dump trucks, and various techniques for improving fuel efficiency are suggested.

For example, in Patent Literature 1, a technique is suggested, in which electric power generated by a regenerative braking device and electric power required by an auxiliary device are successively measured and compared, and only when the regenerating electric power exceeds the electric power required by the auxiliary device, a load output of a power generator for auxiliary device is reduced, and the regenerating electric power is simultaneously supplied to the auxiliary device.

CITATION LIST

Patent Literature

Patent Literature 1: U.S. Patent Application Laid-Open Publication No. 2010/0039054

SUMMARY OF INVENTION

Technical Problem

However, in using a dump truck on a mine site, mine roads on which the dump truck are traveling are not necessarily flat, it is expected that the regenerating electric power generated from the regenerative braking device fluctuates significantly and varies transiently. Therefore, in the method, as described above, of successively measuring and comparing the regenerating electric power and the electric power required by the auxiliary device to determine electric power supply to the auxiliary device based on the result of the comparison, rapid control is required. As a result, to enable replenishment of electric power to the auxiliary device at appropriate timing, improved performance in the control system is required, for a factor of cost increases.

Solution to Problem

According to an aspect of the present invention, in a regenerative braking device of a dump truck comprising an engine, a first generator and a second generator driven by the engine, at least one travel motor driven by generated electric power of the first generator and at least one fan motor to which generated electric power of the second generator is inputted via a first rectifier circuit, the regenerative braking device comprises: a resistive element to which regenerating electric power from the at least one travel motor in regenerative braking is supplied and which is cooled by at least one fan driven by the at least one fan motor and converts electric energy into heat energy and dissipates heat; and a DC/DC converter that inputs a part of the regenerating electric power which is supplied to the resistive element to an output line of the first rectifier circuit via a second rectifier circuit.

Advantageous Effects of Invention

According to the present invention, it is possible to automatically supply regenerating electric power to at least one grid box fan motor, which is an auxiliary device, at appropriate timing in response to conditions of the regenerating electric power.

DESCRIPTION OF EMBODIMENTS

Figure 1:
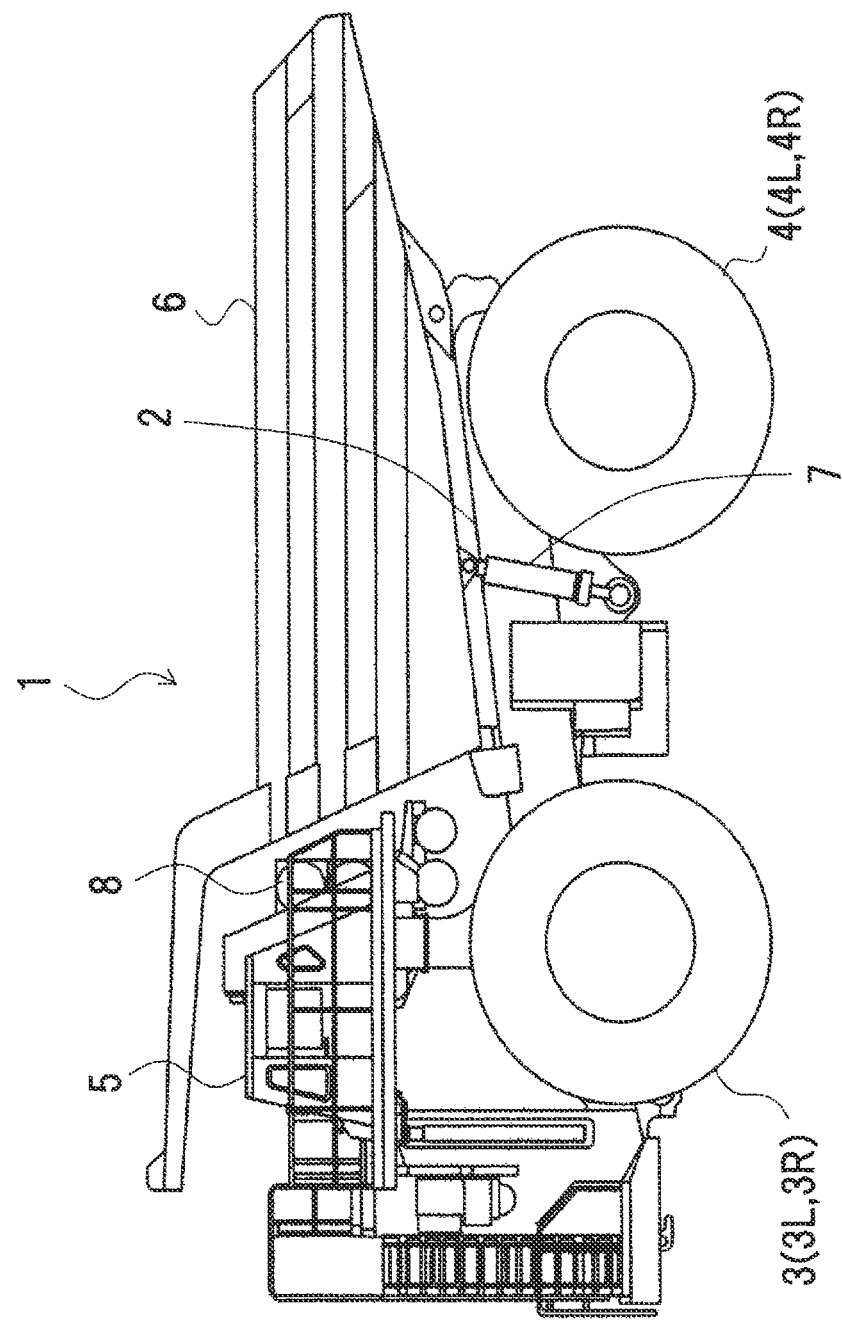
FIG. 1 is a diagram showing a general configuration of a dump truck.

Hereinafter, an exemplary embodiment according to the present invention will be described in detail with reference to attached drawings. FIG. 1 is a diagram showing a general configuration of a dump truck. A dump truck 1 shown in FIG. 1 comprises: a frame 2; front wheels 3 (3L, 3R) and rear wheels 4 (4L, 4R) rotatably provided at lower portions of the frame 2; a cab 5 provided at a front portion of the frame 2; and a vessel 6 tiltably provided at a rear portion of the frame 2.

The vessel 6 to be loaded with dirt or others is tilted by extension/contraction driving of a hoist cylinder 7. On a rear side of the cab 5, a grid box 8 containing grid box resistors, to be described later, is provided. Though not shown in the figure, in the cab 5, an operation unit comprising, such as an accelerator pedal, a brake pedal, a hoist pedal or a steering wheel, is installed. An operator can control accelerator forces of the dump truck 1 by a depression amount of the accelerator pedal, or can control braking forces by depression amount of the brake pedal. Moreover, the operator can perform dumping operations by hydraulic driving by depressing the hoist pedal, or can perform steering operations by hydraulic driving due to steering wheel operations.

Figure 2:
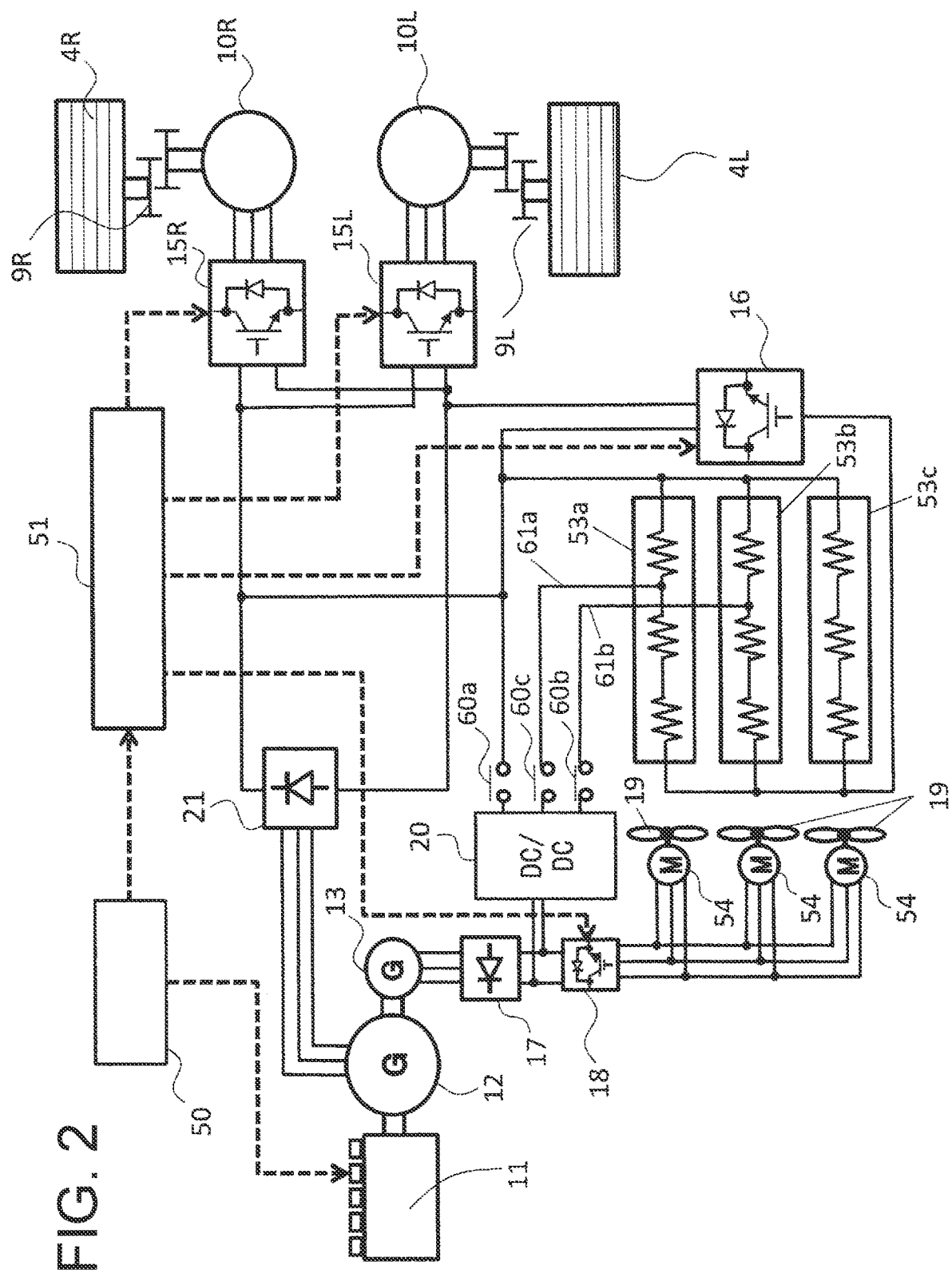
FIG. 2 is a diagram showing an outline of a power system of the dump truck.

FIG. 2 is a diagram showing an outline of a power system of the dump truck 1. The dump truck 1 travels by supplying electric power generated by driving a main generator 12 by an engine 11 to travel motors 10L, 10R to drive the rear wheels 4 (4L, 4R) by the travel motors 10L, 10R.

A three-phase AC voltage generated by the main generator 12 is converted into a DC voltage by a main generator rectifier circuit (for example, a diode bridge circuit) 21, and is inputted to travel motor inverters 15R, 15L. The travel motor inverters 15R, 15L are an electric power conversion device to convert the inputted DC voltage into the three-phase AC voltage. The three-phase AC voltage outputted from the travel motor inverter 15R is inputted to the travel motor 10R that drives the rear wheel 4R. The travel motor 10R is mechanically connected to the rear wheel 4R via a decelerator 9R. The travel motor 10R and the decelerator 9R are contained in a rotary shaft part of the rear wheel 4R.

Similarly, the three-phase AC voltage outputted from the travel motor inverter 15L is inputted to the travel motor 10L that drives the rear wheel 4L. The travel motor 10L is mechanically connected to the rear wheel 4L via a decelerator 9L. The travel motor 10L and the decelerator 9L are contained in a rotary shaft part of the rear wheel 4L.

To a DC line between the main generator rectifier circuit 21 and the travel motor inverters 15R, 15L, as a device for converting regenerating electric power into heat energy and dissipating heat, grid box resistors 53a to 53c and a chopper 16 are connected. In other words, by releasing regenerative energy by the grid box resistors 53a to 53c as heat energy, regenerative braking forces can be obtained. In the example shown in FIG. 2, there are provided three grid box resistors 53a, 53b, 53c that are connected in parallel. Note that the number of grid box resistors is not limited to three, and the number is appropriately set in accordance with the maximum power of the regenerating electric power.

Though not shown in the figure, the dump truck 1 comprises a mechanical braking system, and thereby, speed of the dump truck 1 can be reduced by appropriately using the above-described regenerative braking forces and the mechanical braking forces by the mechanical braking system.

To an output shaft of the engine 11, in addition to the above-described main generator 12, an auxiliary generator 13 for supplying electric power to the auxiliary device is mechanically connected. The three-phase AC voltage generated by the auxiliary generator 13 is converted into the DC voltage by an auxiliary generator rectifier circuit (for example, a diode bridge circuit) 17. The auxiliary generator rectifier circuit 17 is connected to a grid box fan motor inverter 18. The DC voltage outputted from the auxiliary generator rectifier circuit 17 is converted into an AC voltage by the grid box fan motor inverter 18, and the three-phase AC electric power is supplied to three grid box fan motors 54.

Based on conditions of the dump truck 1 or operational inputs by the operator (for example, accelerator pedal operations, brake pedal operations or others), a main controller 50 performs integrative control for the engine 11 or a power controller 51. The power controller 51 inputs, in accordance with the control by the main controller 50, an on/off signal to a semiconductor switch (not shown) provided to each of the travel motor inverters 15R, 15L, the chopper 16 and the grid box fan motor inverter 18. Consequently, the power controller 51 operates the travel motors 10R, 10L, the grid box resistors 53a to 53c and the grid box fan motors 54 at appropriate timing and outputs, to thereby control an electric power flow in the braking operation.

The heat generated in the grid box resistors 53a to 53c is dissipated into the surrounding atmosphere. When exothermic energy is large, the grid box resistors 53a to 53c have high temperature. When forced cooling of the grid box resistors 53a to 53c is required, the power controller 51 inputs a control signal to drive the grid box fan motors 54 to the grid box fan motor inverter 18, to thereby rotationally drive fans 19 by the grid box fan motors 54. The grid box resistors 53a to 53c are subjected to forced cooling by cooling air generated by rotation of the fans 19.

The embodiment has a configuration that provides a DC/DC converter 20 and connects an output side of the DC/DC converter 20 to the DC line between the auxiliary generator rectifier circuit 17 and the grid box fan motor inverter 18, to thereby use a part of the regenerating electric power flowing into the grid box resistors 53a to 53c for driving the grid box fan motors 54.

Figure 3:
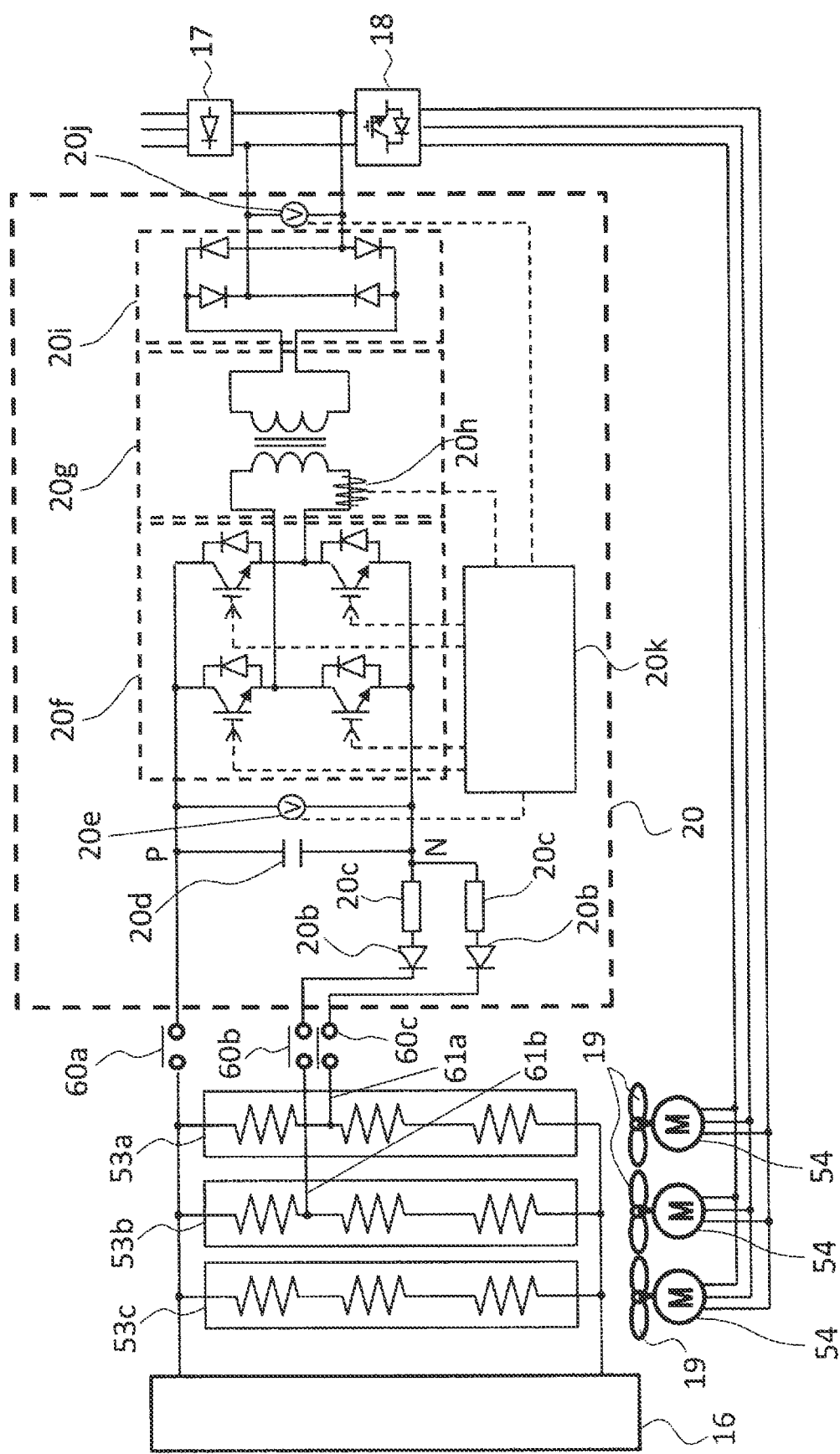
FIG. 3 is a diagram illustrating a configuration of a DC/DC converter.

FIG. 3 is a diagram illustrating a configuration of the DC/DC converter 20. A primary side (input side) of the DC/DC converter 20 is connected to the grid box resistors 53a to 53c, and a secondary side (output side) thereof is connected to an input side of the grid box fan motor inverter 18.

An input terminal on a high-potential side (hereinafter, referred to as a P-side) of the primary side of the DC/DC converter 20 is connected to a high-potential side of the grid box resistors 53a to 53c via a relay 60a. On the other hand, an input terminal on a low-potential side (hereinafter, referred to as an N-side) of the primary side of the DC/DC converter 20 is connected to a leader line 61b extracted from the middle of the grid box resistor 53b via a relay 60b and is also connected to a leader line 61a extracted from the middle of the grid box resistor 53a via a relay 60c. The relays 60a to 60c are, for example, brought into a close state by activating the dump truck 1 (turning on an ignition key switch), and are brought into an open state by stopping thereof (turning off the ignition key switch).

Into an input line of the N-side, a diode 20b for backflow prevention and a resistance 20c for current limitation are inserted in series, to prevent an excessive current from flowing in the leader lines 61a, 61b. Moreover, between a P-side line and an N-side line, a smoothing capacitor 20d, a voltage sensor 20e and a semiconductor bridge circuit 20f are connected. On an AC output side of the semiconductor bridge circuit 20f, a transformer 20g and a current sensor 20h are connected. On an output side of the transformer 20g, a rectifier circuit 20i is connected. In the example shown in FIG. 3, a diode bridge circuit is provided as the rectifier circuit 20i. On a DC output side of the rectifier circuit 20i, a voltage sensor 20j is connected.

A sensor measurement value of each of the voltage sensor 20e, the current sensor 20h and the voltage sensor 20j is inputted to a controller part 20k of the DC/DC converter 20. The controller part 20k inputs a PWM (Pulse Width Modulation) control signal based on the inputted sensor measurement values to the semiconductor bridge circuit 20f, and controls a primary input voltage to the transformer 20g within a certain range so that an output voltage of the DC/DC converter 20 does not exceed the maximum control voltage V20 max.

(Driving Electric Power of Grid Box Fan Motors 54 in Regenerative Braking)

Next, by use of FIGS. 4 and 5, a description will be given of driving electric power of the grid box fan motors 54 when an operator depresses the brake pedal or in braking operation on a downhill.

Figure 4:
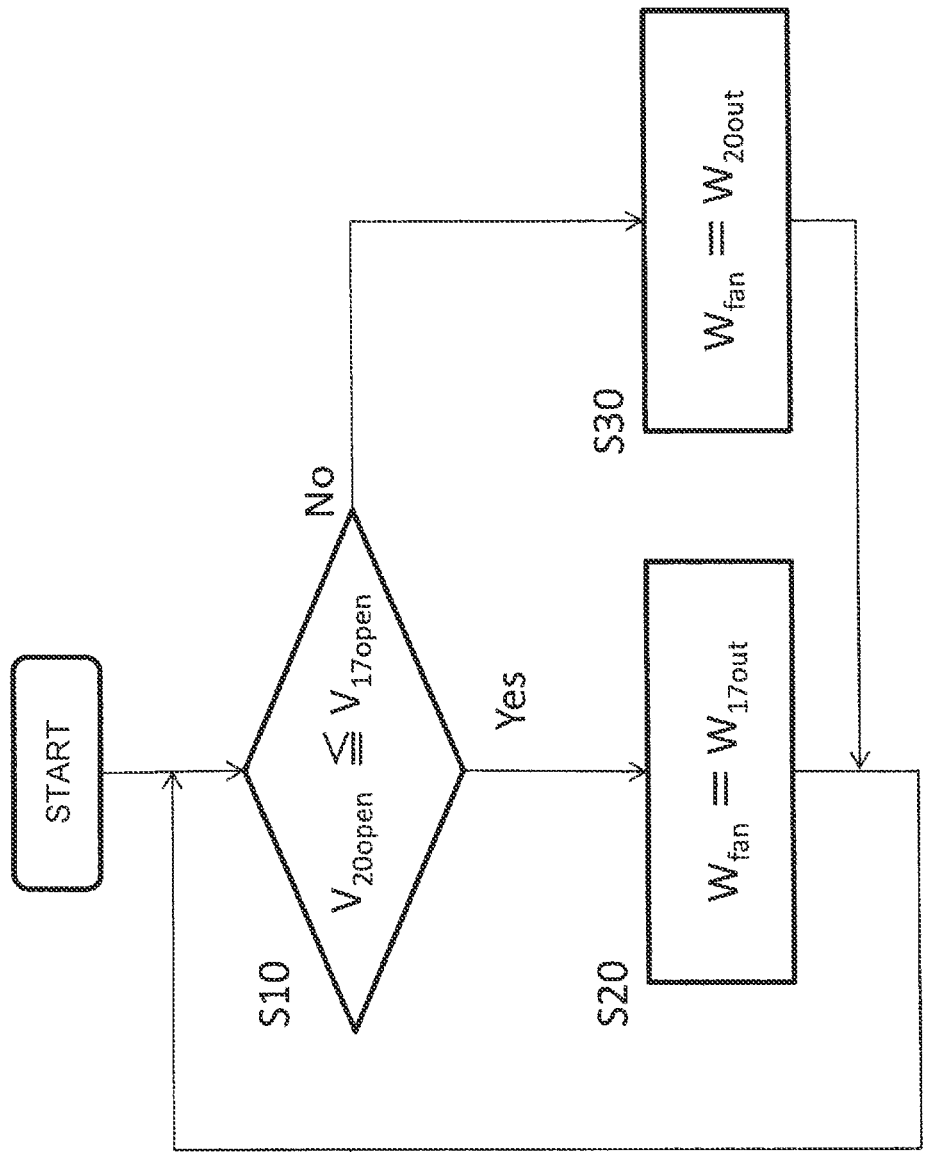
FIG. 4 is a flowchart illustrating driving electric power of grid box fan motors when a vehicle is braked.
Figure 5:
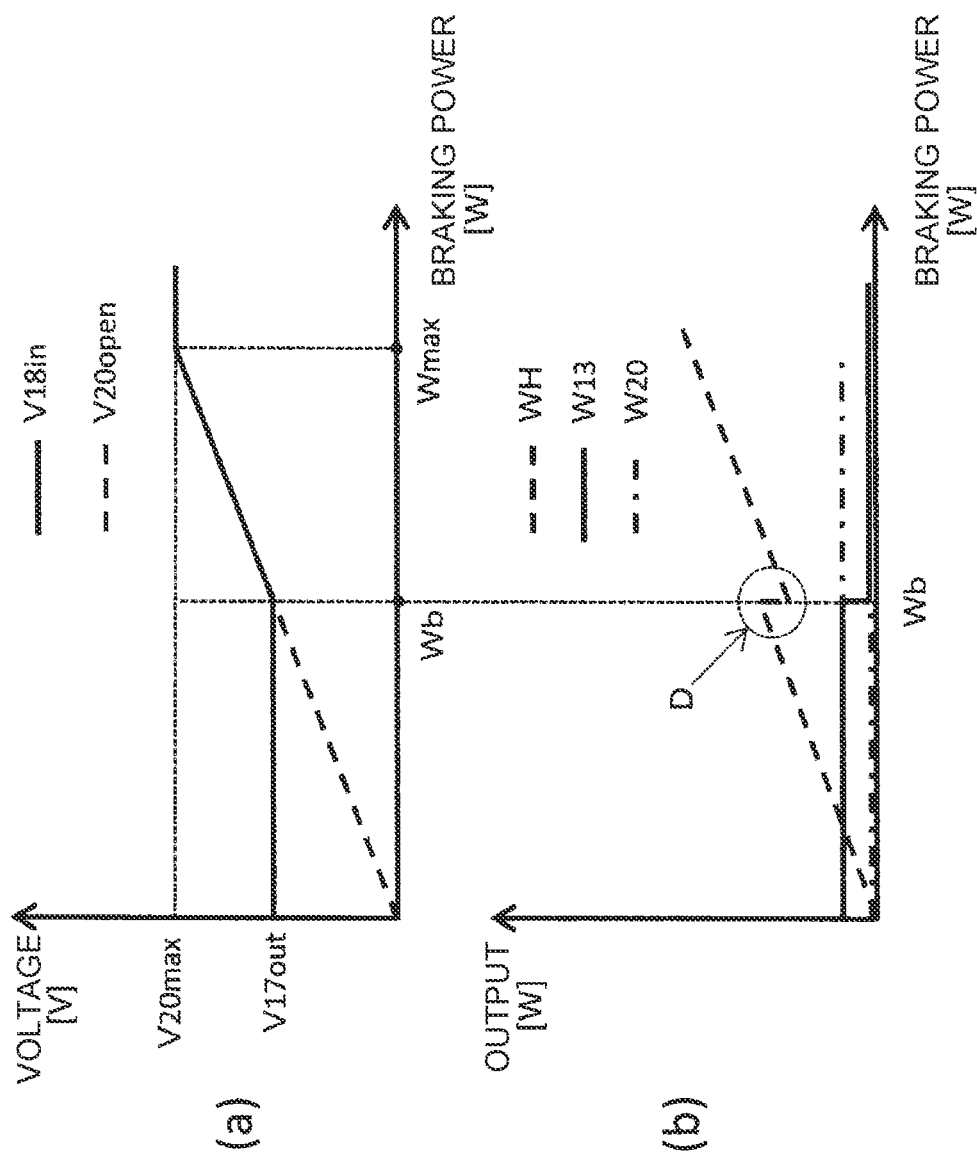
FIG. 5 is a timing chart showing transitions of an input voltage to a grid box fan motor inverter, an output-side open-circuit voltage of the DC/DC converter, generated electric power of an auxiliary generator, an output voltage of the DC/DC converter and a heat generation amount of grid box resistors when regenerative braking is performed.

A flowchart in FIG. 4 shows a flow until driving electric power of the grid box fan motors 54 during braking of a vehicle is determined. As described below, processes in steps S10 to S30 in FIG. 4 are automatically performed in accordance with braking power due to a configuration in which the output side of the DC/DC converter 20 is connected to the DC line between the auxiliary generator rectifier circuit 17 and the grid box fan motor inverter 18.

Moreover, FIG. 5(a) is a diagram showing a relationship between an input voltage V18in of the grid box fan motor inverter 18 and an output-side open-circuit voltage V20open of the DC/DC converter 20 in the regenerative braking and the braking power. FIG. 5(b) is a diagram showing a relationship among the generated electric power of the auxiliary generator 13, an output voltage of the DC/DC converter 20, a heat generation amount of the grid box resistors 53a to 53c and the braking power.

When the dump truck 1 is braked, a control signal for deceleration is inputted from the power controller 51 to the travel motor inverters 15L, 15R, and the travel motors 10L, 10R operate as generators. In other words, kinetic energy of the vehicle is converted into electric energy by the regenerative operation. The voltage on the DC side of the travel motor inverters 15L, 15R is increased by power generation energy, and, when the voltage exceeds a prescribed value, the power controller 51 causes the chopper 16 to operate. When the chopper 16 starts to operate, the flow in FIG. 4 is started.

When the chopper 16 is operated, electric power (regenerating electric power) flows from the DC line between the main generator rectifier circuit 21 and the travel motor inverters 15R, 15L into the grid box resistors 53a to 53c. Since the relays 60a to 60c shown in FIGS. 2 and 3 are closed when the dump truck 1 is operated, when a voltage is applied to the grid box resistors 53a to 53c by the operation of the chopper 16, a voltage, which is a potential difference between a potential on a higher potential side of the DC line between the main generator rectifier circuit 21 and the travel motor inverters 15R, 15L and a potential of the leader lines 61a, 61b, is applied to the primary side of the DC/DC converter 20.

The input voltage of the DC/DC converter 20 is low when the braking power is small, and the DC/DC converter 20 cannot output a large voltage. When the output side open-circuit voltage V20open of the DC/DC converter 20 is not more than the output side open-circuit voltage V17open of the auxiliary generator rectifier circuit 17 (V20open≤V17open), the input voltage V18in of the grid box fan motor inverter 18 becomes equal to the output voltage V17out of the auxiliary generator rectifier circuit 17 (refer to FIG. 5(a)).

At this time, since the voltage of the DC line between the auxiliary generator rectifier circuit 17 and the grid box fan motor inverter 18 (=V18in) is higher than the output voltage of the transformer 20g, the output voltage of the transformer 20g is blocked by the rectifier circuit 20i, and the output electric power W20 of the DC/DC converter 20 is reduced to zero. As a result, a primary source of the driving electric power Wfan of the grid box fan motors 54 becomes the auxiliary generator 13, and thereby the driving electric power Wfan is covered by the output electric power W17out of the rectifier circuit 17 (Wfan=W17out: step S20). In other words, the grid box fan motors 54 is driven by the generated electric power W13 of the auxiliary generator 13 (refer to FIG. 5(b)).

As shown in FIG. 5(a), as the braking power is increased, the output side open-circuit voltage V20open of the DC/DC converter 20 is gradually increased. Then, when the braking power becomes larger than the value Wb, the output side open-circuit voltage V20open of the DC/DC converter 20 exceeds the output side open-circuit voltage V17open of the auxiliary generator rectifier circuit 17. When the output side open-circuit voltage V20open of the DC/DC converter 20 becomes larger than the output side open-circuit voltage V17open of the auxiliary generator rectifier circuit 17, the input voltage V18in of the grid box fan motor inverter 18 becomes equal to the output voltage of the DC/DC converter 20.

At this time, since the voltage of the DC line between the auxiliary generator rectifier circuit 17 and the grid box fan motor inverter 18 is higher than the output voltage of the auxiliary generator 13, the output voltage of the auxiliary generator 13 is blocked by the auxiliary generator rectifier circuit 17, and the load of the auxiliary generator 13 is reduced, to thereby reduce the generated electric power W13. Here, since the auxiliary generator 13 is configured to supply electric power only to the grid box fan motors 54, the generated electric power W13 is reduced to zero (refer to FIG. 5(b)).

As a result, the primary source of the driving electric power Wfan of the grid box fan motors 54 is derived from the travel motors 15L, 15R, and thereby the driving electric power Wfan is covered by the output electric power W20out of the DC/DC converter 20 (Wfan=W20out: step S30). In other words, the grid box fan motors 54 are driven by the regenerating electric power.

As described above, in the range of braking power>Wb, since the grid box fan motors 54 are driven by the regenerating electric power, the load of the auxiliary generator 13, namely, the load of the engine 11 is reduced, and thereby fuel consumption can be reduced. Moreover, since a part of the regenerating electric power, which has been consumed by the grid box resistors 53a to 53c, is consumed by the grid box fan motors 54, when the braking power exceeds Wb (the point indicated by the reference sign D in FIG. 5(b)), a heat generation amount WH of the grid box resistors 53a to 53c is reduced.

Note that, in FIG. 5(a), when the braking power becomes larger than Wmax, the controller part 20k of the DC/DC converter 20 controls the primary input voltage to the transformer 20g so that the output voltage of the DC/DC converter 20 does not exceed the maximum control voltage V20 max, namely, V20open=V20 max holds.

Thereafter, when the braking power is reduced, the output side open-circuit voltage V20open of the DC/DC converter 20 is reduced to become lower than the output side open-circuit voltage V17open of the auxiliary generator rectifier circuit 17. Therefore, the output voltage of the transformer 20g is blocked again by the rectifier circuit 20i, and the output electric power W20out of the DC/DC converter 20 is reduced to zero. As a result, the grid box fan motors 54 are driven only by the electric power from the auxiliary generator 13.

(Example of Braking Operation on a Mine Site)

Figure 6:
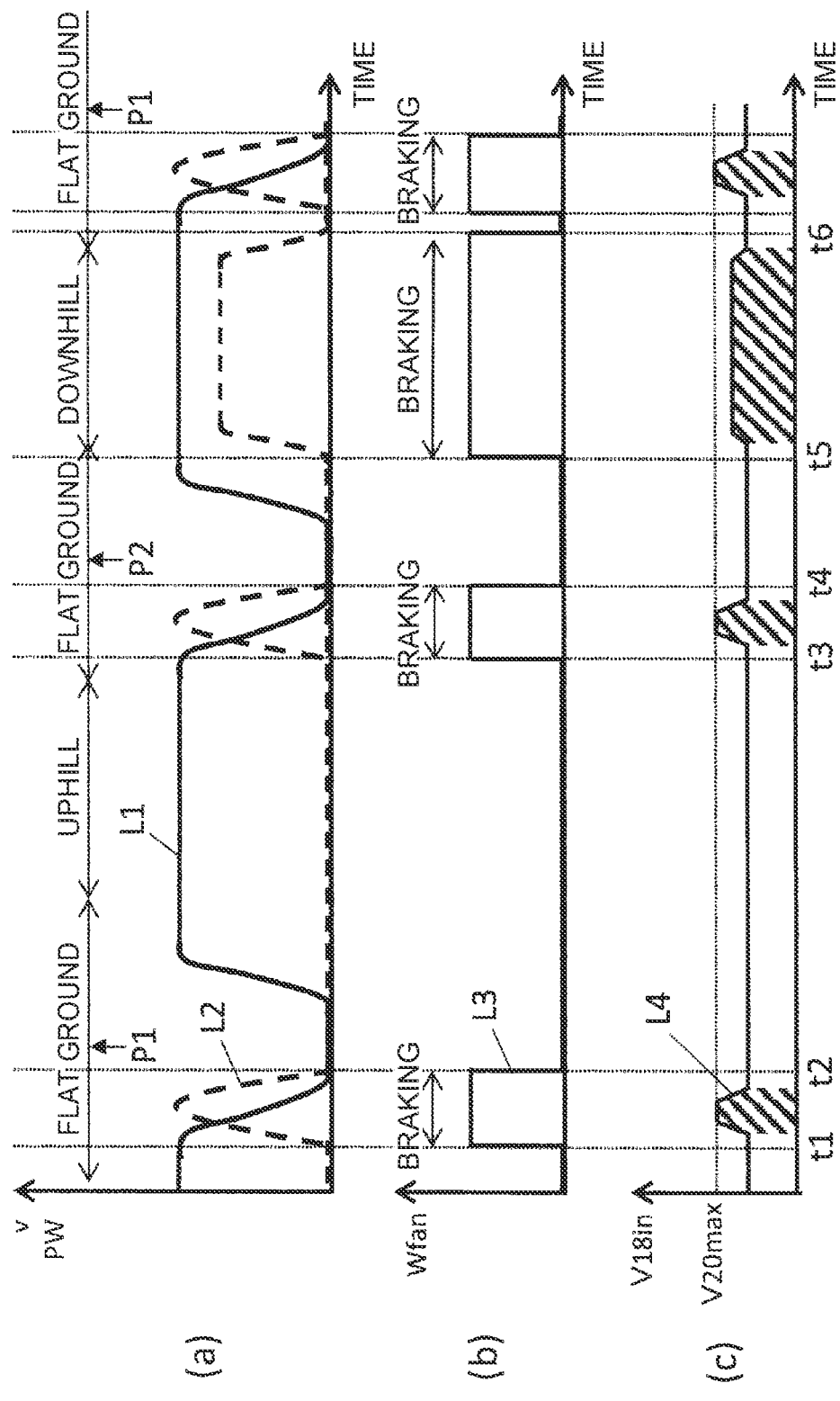
FIG. 6 is a timing chart showing an example of braking operation when the dump truck works at a mine site.

FIG. 6 shows an example of braking operation when the dump truck 1 works on a mine site. Lines L1, L2 in FIG. 6(a) represent transition of the speed v and the braking power PW of the dump truck 1, respectively. Note that P1 and P2 indicate timings when the dump truck 1 arrives at an excavating site and a primary loading place, respectively. Moreover, a line L3 in FIG. 6(b) indicates transition of the output Pf (watt) of the grid box fan motors 54, and a line L4 in FIG. 6(c) indicates transition of the input voltage V18in of the grid box fan motor inverter 18.

Note that, here, for simplifying the description, it is assumed that the dump truck 1 performs braking operation only when stopping in traveling or on the downhill. Moreover, cooling by the fans 19, that is, driving of the grid box fan motors 54 is performed only in the braking operation.

First, the dump truck 1 travels to an excavating site P1, and braking is performed by depressing the brake pedal by the operator, and thereby the dump truck 1 stops near an excavator, such as a hydraulic shovel and the like. As indicated by the curved line L2, the braking power (L2) is generated in the braking operation (from the time t1 to the time t2). Since the cooling by the fans 19 is performed only in braking, as shown in FIG. 6(b), the output Wfan of the grid box fan motors 54 is generated from the time t1 to the time t2. Moreover, when the braking power as indicated by the line L2 is generated, the relationship V20open>V17open holds during the hatched period in the braking period t1 to t2, that is, in this period, the grid box fan motors 54 are driven by the regenerating electric power. In other words, the load of the auxiliary generator 13 is reduced to zero, and therefore, the output of the engine 11 is reduced.

Note that, when the output voltage of the DC/DC converter 20 (namely, the input voltage V18in of the grid box fan motor inverter 18) reaches the maximum control voltage V20 max by increases of the braking power, the controller part 20k controls the DC/DC converter 20 so that the output voltage thereof does not exceed the maximum control voltage V20 max.

When the dump truck 1 is stopped and the braking power is reduced, the input voltage V18in of the grid box fan motor inverter 18 is maintained at the output voltage of the auxiliary generator rectifier circuit 17.

Next, the dump truck 1 sufficiently loaded with ores starts traveling again to head for a primary loading place P2 at the top of a hill. On this occasion, the braking operation is rarely performed until the uphill traveling is ended. When approaching the primary loading place P2, the dump truck 1 performs the braking operation and stops. The braking power (L2) is generated in the braking operation (from the time t3 to the time t4). Then, during the hatched period in which V20open>V17open holds, driving of the grid box fan motors 54 by the regenerating electric power is performed.

After dumping dirt or others to the primary loading place P2, the dump truck 1 starts traveling again toward the excavating site P1. Since the dump truck 1 is in the downhill traveling, it is necessary to continue braking for going down the long slope. Therefore, in the downhill traveling (from the time t5 to the time t6), during almost all the time, the grid box fan motors 54 are driven by the output electric power W20out of the DC/DC converter 20 (namely, the regenerating electric power).

On the mine site, the dump truck 1 repeats the above-described operations. As indicated by hatching in FIG. 6(c), in most of the time in which the grid box fan motors 54 are driven, the grid box fan motors 54 are driven by the output electric power W20out of the DC/DC converter 20. Since the output of the auxiliary generator 13 is almost zero during the period in which the grid box fan motors 54 are driven by the output electric power W20out of the DC/DC converter 20, output of the engine required to drive the grid box fan motors 54 can be reduced; accordingly, vehicle fuel economy can be improved.

Figure 7:
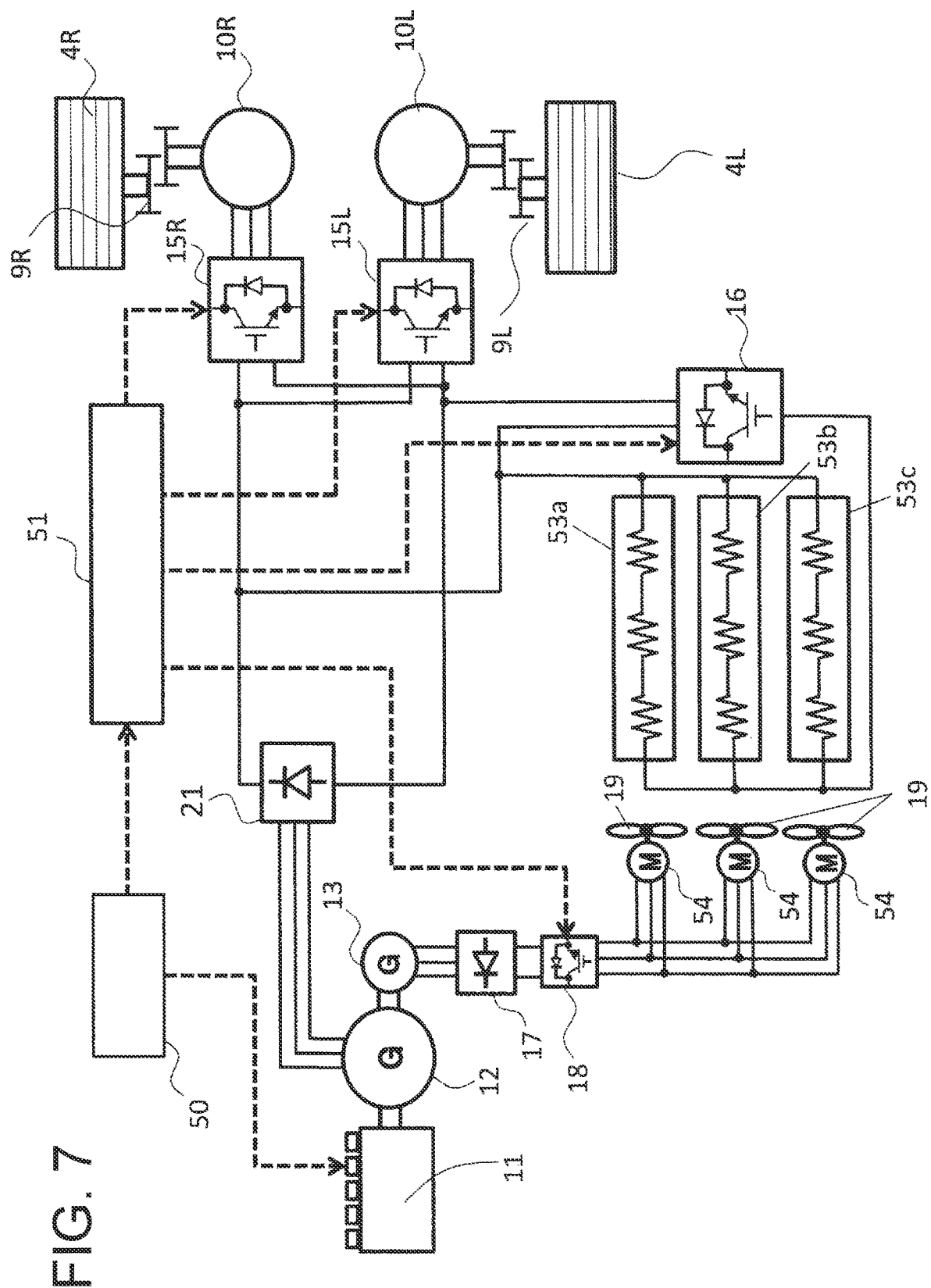
FIG. 7 is a diagram showing a comparative example.

FIG. 7 shows, as a comparative example, an outline of the power system of the dump truck 1 when the grid box fan motors 54 are driven only by the generated electric power of the auxiliary generator 13. In this configuration, since all the driving electric power of the grid box fan motors 54 is covered by the generated electric power of the auxiliary generator 13, the engine 11 is required to output additional driving force for driving the grid box fan motors 54 during, for example, all the periods of t1 to t2, t3 to t4, and t5 to t6 in FIG. 6(c). Therefore, as compared to the above-described embodiment, the fuel consumption is increased.

As described above, in the embodiment, in the regenerative braking device (16, 20, 53a to 53c) of the dump truck 1 comprising the engine 11, the main generator (the first generator) 12 and the auxiliary generator (the second generator) 13 driven by the engine 11, the travel motors 10L, 10R driven by the generated electric power of the main generator 12 and the grid box fan motors (the fan motors) 54 to which the generated electric power of the auxiliary generator 13 is inputted via the auxiliary generator rectifier circuit (the first rectifier circuit) 17, there is provided the DC/DC converter 20 that inputs a part of the regenerating electric power supplied to the grid box resistors (the resistive elements) 53a to 53c, which convert electric energy into heat energy and dissipate heat, to the output line of the auxiliary generator rectifier circuit 17 via the rectifier circuit (the second rectifier circuit) 20i of the DC/DC converter 20.

With such a configuration, when a magnitude relationship between the output side open-circuit voltage V20open of the DC/DC converter 20 and the output side open-circuit voltage V17open of the auxiliary generator rectifier circuit 17 is V20open≤V17open, the output voltage of the transformer 20g is blocked by the rectifier circuit 20i, and the grid box fan motors 54 are driven by the generated electric power of the auxiliary generator 13. Conversely, when the relationship is V20open>V17open, the output voltage of the auxiliary generator 13 is blocked by the auxiliary generator rectifier circuit 17, and the grid box fan motors 54 are driven by the regenerating electric power inputted from the DC/DC converter 20.

As a result, it is possible to automatically supply regenerating electric power to grid box fan motors 54, which is an auxiliary device, at appropriate timing in response to conditions of the regenerating electric power, and to securely supply the electric power necessary to the grid box fan motors 54. Further, it is unnecessary to provide a control system, as in the past, for switching between the regenerating electric power and the generated electric power of the auxiliary generator 13.

Moreover, since the load of the auxiliary generator 13 is reduced by supplying the regenerating electric power to the grid box fan motors 54, the fuel economy of the engine 11 driving the auxiliary generator 13 can be improved. Further, as shown in FIG. 6, it is possible to suppress fluctuation in the load of the auxiliary generator 13 by synchronizing the timing requiring driving of the grid box fan motors 54 and the timing of using the regenerating electric power.

Moreover, as shown in FIG. 3, it is preferable to provide a configuration in which the leader lines (the voltage leader lines) 61a, 61b are extracted from the middle of the grid box resistors 53a, 53b to apply a voltage, which is lower than the voltage applied to the grid box resistors 53a to 53c, to the primary side of the DC/DC converter 20.

With such a configuration, it becomes possible that the DC/DC converter 20 can be formed of components of low withstand voltage; therefore, the components can be smaller in size and the costs can be reduced. For example, though the voltage of the DC side of the travel motor inverters 15L, 15R in regeneration exceeds 1000V, the voltage of the grid box fan motors 54 is on the order of 600V; therefore, in consideration of the withstand voltage of the DC/DC converter 20, it is preferable to extract, as the leader lines 61a, 61b, the voltage from the middle of the grid box resistors 53a to 53c.

Of course, when the withstand voltage of the components composing the DC/DC converter 20 is higher than the voltage applied to the grid box resistors 53a to 53c, it may be possible to provide a configuration in which a both-end voltage of the grid box resistors 53a to 53c is inputted to the DC/DC converter 20.

Note that the foregoing description is merely an example, and provided that the essential characteristics of the present invention are not lost, the present invention is not limited by the above-described embodiment. For example, in the above-described embodiment, the auxiliary generator 13 mainly generates the driving electric power for the grid box fan motors 54; however, the electric power may be used for driving other auxiliary devices (electric appliances), or may be used for both of them.

REFERENCE SIGNS LIST

1 Dump truck
10L, 10R Travel motor
11 Engine
12 Main generator (first generator)
13 Auxiliary generator (second generator)
15R, 15L Travel motor inverter
16 Chopper (regenerative braking device)
17 Auxiliary generator rectifier circuit (first rectifier circuit)
18 Grid box fan motor inverter
19 Fan
20 DC/DC converter (regenerative braking device)
20i Rectifier circuit (second rectifier circuit)
53a to 53c Grid box resistor (resistive element, regenerative braking device)
54 Grid box fan motor
61a, 61b Leader line

The invention claimed is:

1. A regenerative braking device of a dump truck comprising an engine, a first generator and a second generator driven by the engine, at least one travel motor driven by generated electric power of the first generator, and at least one fan motor to which generated electric power of the second generator is inputted via a first rectifier circuit and an inverter,
the regenerative braking device comprising:
at least one resistive element to which regenerating electric power from the at least one travel motor in regenerative braking is supplied and which is cooled by at least one fan driven by the at least one fan motor and converts electric energy into heat energy and dissipates heat; and
a DC/DC converter that supplies a part of the regenerating electric power which is supplied to the at least one resistive element to the at least one fan motor via the inverter, wherein
the DC/DC converter includes:
a transformer that transforms the part of the regenerating electric power which is supplied to the at least one resistive element; and
a second rectifier circuit that is connected to an output side of the transformer and an output line between the first rectifier circuit and the inverter,
when an output side open-circuit voltage of the DC/DC converter is equal to or less than an output side open-circuit voltage of the second rectifier circuit, an output voltage of the transformer is blocked by the second rectifier circuit, and the at least one fan motor is driven by the electric power of the second generator, and
when the output side open-circuit voltage of the DC/DC converter is more than the output side open-circuit voltage of the second rectifier circuit, the electric power of the second generator is blocked by the first rectifier circuit, and the at least one fan motor is driven by the part of the regenerating electric power which is output from the DC/DC converter.

2. The regenerative braking device according to claim 1, wherein the second rectifier circuit is a diode bridge circuit.

3. The regenerative braking device according to claim 1, further comprising: a voltage leader line that extracts a voltage, which is lower than a voltage applied to the at least one resistive element, from the at least one resistive element to apply the extracted voltage to a primary side of the DC/DC converter.

4. A dump truck comprising:
an engine;
a first generator and a second generator driven by the engine;
at least one travel motor driven by generated electric power of the first generator;
at least one fan motor to which generated electric power of the second generator is inputted via a first rectifier circuit; and
the regenerative braking device according to claim 1.

* * * * *